United States Patent
Fabel et al.

(10) Patent No.: US 7,341,279 B2
(45) Date of Patent: Mar. 11, 2008

(54) COMBINATION MAILER AND CONFIRMATION POST CARD ASSEMBLY

(75) Inventors: Warren M. Fabel, Boca Raton, FL (US); Jose B. Cortez, Boynton Beach, FL (US)

(73) Assignee: Laser Substrates Inc., Boca Raton, FL (US)

(*) Notice: Subject to any disclaimer, the term of this patent is extended or adjusted under 35 U.S.C. 154(b) by 993 days.

(21) Appl. No.: 10/418,621

(22) Filed: Apr. 18, 2003

(65) Prior Publication Data

US 2004/0129767 A1    Jul. 8, 2004

(51) Int. Cl.
*B42D 15/00*    (2006.01)
*B65D 27/00*    (2006.01)

(52) U.S. Cl. .................. 283/116; 283/62; 229/92.1; 229/92.8

(58) Field of Classification Search ............ 229/92.8, 229/92.1, 74; 283/81, 94, 98–101, 103, 105, 283/106, 62, 116; 281/2, 3.1, 5; 428/40.1, 428/42.1–42.3, 43, 41.9, 201
See application file for complete search history.

(56) References Cited

U.S. PATENT DOCUMENTS

| | | | | |
|---|---|---|---|---|
| 4,682,793 A * | 7/1987 | Walz | ............................ | 462/2 |
| 5,183,203 A * | 2/1993 | Sanders | ...................... | 229/300 |
| 5,501,393 A * | 3/1996 | Walz | ......................... | 229/92.8 |
| 5,598,970 A * | 2/1997 | Mudry et al. | ............... | 229/305 |
| 5,752,647 A * | 5/1998 | Schubert et al. | ........... | 229/92.1 |
| 5,950,910 A * | 9/1999 | Petkovsek | .................. | 229/92.8 |
| 6,039,242 A * | 3/2000 | Tee | ............................. | 229/92.1 |
| 2005/0001021 A1 * | 1/2005 | Hutchinson | ................. | 229/300 |

* cited by examiner

*Primary Examiner*—Monica Carter
*Assistant Examiner*—Pradeep C Battula
(74) *Attorney, Agent, or Firm*—Jon A. Gibbons; Fleit Kain Gibbons Gutman Bongini & Bianco P.L.

(57) ABSTRACT

A form assembly formed by front and back plies for creating a postcard having printing on both faces from a single pass through a non-impact printing device.

8 Claims, 12 Drawing Sheets

COMBINATION MAILER AND CONFIRMATION POST CARD ASSEMBLY

BACKGROUND OF THE INVENTION

This invention relates to postal forms which, having an image placed on a single face thereof by a single pass through a non-impact printer, can be folded or manipulated in a particular way to provide images on two faces of the form. The subject invention, more particularly, relates to postal forms which can provide a plurality of postal forms useful for specialized postal services, e.g., Certified mail.

Many types of specialized business forms, including postal forms, are made for use with non-impact printers such as laser or ink-jet printing devices. Non-impact printers are being increasingly used to provide a fast, economical, and convenient method of printing data or other information stored in computer system databases. For example, notices to business customers or debtors can be generated automatically from databases containing retrievable information specific for that customer or debtor. Because such notices often carry legal significance, sending those notices via United States Postal. Service (USPS) Certified, Registered, or other specialized mailing procedures can ensure adequate record is made that such notice has been sent and/or received. In most organizations, preparing and distributing these notices represent a significant effort. By automating this process, the burden can be reduced on the organization. Most commonly used non-impact printers are simplex printers and are therefore limited to printing only on a single face of one sheet of paper at a given time. While it is possible to turn the paper over for a second pass through the printer to print on both faces, automated devices which accomplish this turnover function are not commonly available with conventional non-impact printers used in most offices. Moreover, manually feeding the same form a second pass through the printer does not allow for batching, whereby a large number of blank forms are placed in a paper feeding tray and all forms are produced at one time. Further, most pressure-seal documents require specialized folder/sealer equipment which is both expensive and cumbersome to use.

In addition, non-impact printers may be limited in their capacity to handle paper stock that is thicker than conventional paper stock, which typically has a thickness of about 0.003 to 0.0035 inches. Post cards used as confirmation notices compliant with USPS requirements, such as cards used for Certified or Registered mail, require a thickness of between 0.007 inch and 0.0095 inches. Accordingly, using a conventional non-impact printer to print post cards which meet such USPS requirements may cause jamming of the paper feeder mechanism or other paper handling problems. Thus, documents designed to be sent through the mail as postcards, may not be capable of being automatically generated with conventional office non-impact printers.

SUMMARY OF THE INVENTION

In accordance with the subject invention, there is provided a postal form assembly which, when an image is generated on only a front face of the assembly following a single pass through an image forming device, e.g., a non-impact printer such as a laser printer, can be manipulated to provide images on both the front and back faces of a form created from that assembly.

The subject invention concerns an assembly constructed of at least two plies affixed together to form a single, two-ply sheet. This sheet comprises a plurality of perforations or score lines dividing the sheet into distinct sections from which certain portions can be formed into particular useful postal items. Advantageously, the subject postal form assembly has a thickness corresponding to that of standard paper whereby the form can be printed on a conventional non-impact printer without increased risk of jamming in the feeder mechanism of the printer. A further advantage to the subject assembly is that it can be folded in a manner to provide a standard post card having a thickness as required by the United States Postal Service (USPS).

A preferred embodiment of the subject invention concerns an assembly comprising a plurality of sections which provide one or more mail item portions, including a correspondence portion which can be a letter portion containing variable information, a confirmation post card portion which is preferably a USPS Form 3800, and an outgoing envelope or mailer portion, all of which are integrally configured within a single assembly such that variable information can be printed on a single face of each portion by a single pass through a simplex non-impact printer. Manipulation of the assembly or its individual sections by folding and/or adhering certain sections together, in accordance with the intended purpose of the invention can then advantageously result in the printed information being displayed on two faces, e.g., front and back faces, of certain of those portions.

In a further embodiment of the subject invention, the assembly can provide a sender's receipt portion. Preferably, this sender's receipt portion is provided as part of a section of the assembly sheet which is separate from the sections comprising the correspondence and post card portions.

BRIEF DESCRIPTION OF THE DRAWINGS

Preferred embodiments of the subject invention are hereafter described with specific reference being made to the following Figures, in which.

DETAILED DESCRIPTION OF THE INVENTION

The subject invention concerns a postal form assembly constructed of at least two plies affixed together using, preferably, a conventional adhesive to form a single or unitary multi-ply sheet. The multi-ply sheet provides an outgoing mailer or envelope portion and a plurality of sections which can provide additional mail item portions, e.g., a correspondence portion, a post card portion, and in certain embodiments, a sender's receipt portion.

The sections are formed in the assembly by perforations or score lines through one or more of the plies. The perforations are formed in the sheet to facilitate separating one section of the assembly from another section. Typically, each section comprises one or more mail item portions which are further separable from its corresponding section by employing die-cuts defining the portion.

As would be readily understood, the manufacture of a preferred embodiment of the assembly comprises providing a sheet of paper or other printable material for each of two plies, and patternly disposing adhesive and/or adhesive-release material on the desired areas on one face of each ply. Most preferably, the subject invention comprises an adhesive which can be exposed by removing a first ply from a second ply by employing an adhesive-release material disposed on the face and location opposing the adhesive. Adhesives and adhesive-release materials useful for such purposes and employed in the subject invention are well known in the art and commercially available. The plies can be adjoined to form a single, two-ply sheet which can be pre-printed to provide desired color, text, or other features generic to the mail items provided in the assembly. The assembly can then be perforated, scored, or die-cut as predetermined by the intended design of the assembly and the mail items provided thereby.

A preferred embodiment of the subject invention is a postal form assembly providing a plurality of mail items for certified or registered postal service in accordance with the United States Postal Service (USPS) requirements. For example, the assembly of the subject invention can provide, from a two-ply sheet having a size and thickness of standard paper, a post card which is compliant with USPS requirements for post card size and thickness.

The subject invention can be readily understood by reference to the accompanying Figures and written description, herein.

Figure 1:
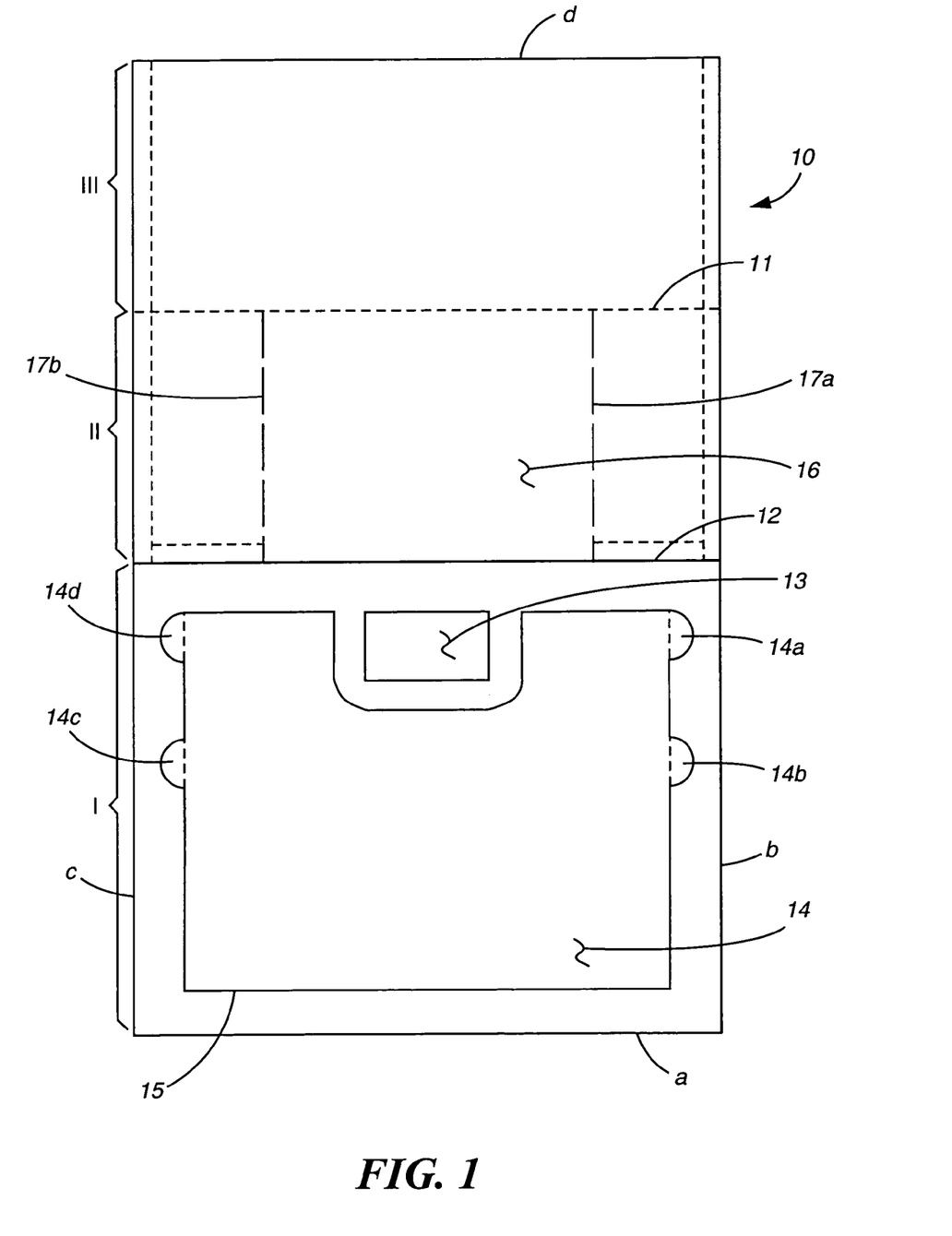
FIG. 1 is a plan view of the front (outer) face of the top ply of the postal form assembly according to a first embodiment of the subject invention.

FIGS. 1-4 concern a first embodiment of the subject invention and show assembly 10 as comprising a plurality of panels and/or sections separated by score lines, die-cuts, or perforations that divide each of the panels and sections from one another. Referring to FIG. 1, assembly 10 shows the front face of a first or top ply of a multi-ply form according to the subject invention, said form bounded by edges a, b, c, and d. As shown in FIG. 1, assembly 10 includes transverse die-cuts 11 and 12 which extend from edges b to c of the form to provide three primary panels I, II, and III of said form. Preferably, the die-cut 12 in the top ply is a substantially continuous cut Panel I comprises two sections defined by perforations around their respective perimeters. Label section 13 is disposed in the top, central area of Panel I and is preferably substantially rectangular in shape. In a preferred embodiment, this label section 13 is formed having adhesive material disposed on its back face. As described below, the adhesive material contacts adhesive-release material disposed on the opposing, inner face of the back ply to allow separation of the first and second plies to expose the adhesive disposed on the back face of said first ply. Label section 13 provides for printing of a return address, which is automatically positioned on the post card of Panel II (described herein below) when the form assembly is manipulated or folded in its first folded configuration. In a most preferred embodiment, the return address is printed by the user in an upside-down configuration relative to the printing on the correspondence section 14. Software for achieving such upside-down printing configuration is readily available.

Correspondence section 14 is formed by a perimetrical die-cut or perforation 15 inset from edges a, b, and c, as well as dividing perforation 12, to provide a substantially rectangular section. In the preferred embodiment of the form comprising label section 13, correspondence section 14 comprises a substantially U-shaped area positioned around label section 13 in order to avoid overlap with label section 13. FIG. 1 also shows the preferred embodiment having tabs 14a, 14b, 14c, and 14d formed as an integral part of correspondence section 14. These tabs comprise die-cuts which form their outer edges, and comprise perforations along the collinear edges of correspondence section 14 from which the tabs are separable. This correspondence section is provided in order to print textual messages, information, or other communications to the recipient of the mailer. After printing of the correspondence section, the mailer can be manipulated such that the text or other message is contained within the outgoing mailer in its folded configuration.

Panel II comprises a post card section 16 which is bounded on two edges (top and bottom edges) by dividing perforations 11 and 12, and is bounded on its other two edges (right and left side edges) by perforations 17a and 17b. Preferably, this front face of post card section 16 can be pre-printed with text and/or graphics such that said post card can serve as a return receipt post card for USPS special mailing services, e.g., Certified Mail or Registered Mail. Variable information can be printed by the user as needed or desired in desired or designated areas of the post card section.

Panel III, which is bordered on three sides by form assembly edges d (top edge), b (right side edge), and c (left side edge), is additionally bordered on its fourth (bottom edge) by dividing perforation 11. The front face of Panel III can serve as the front face of the outgoing mailer, and can include pre-printed indicia, such as special mailing services indicia, face-indicating mark (FIM), bar-codes, postage, or the like, and can also receive variable information, e.g., addressee address information, return address information, or the like, during printing on a non-impact printer by the user of the subject form assembly. Preferably, this panel is printed in a configuration which is rotated 180 degrees relative to the printing on the other panels.

Figure 2:
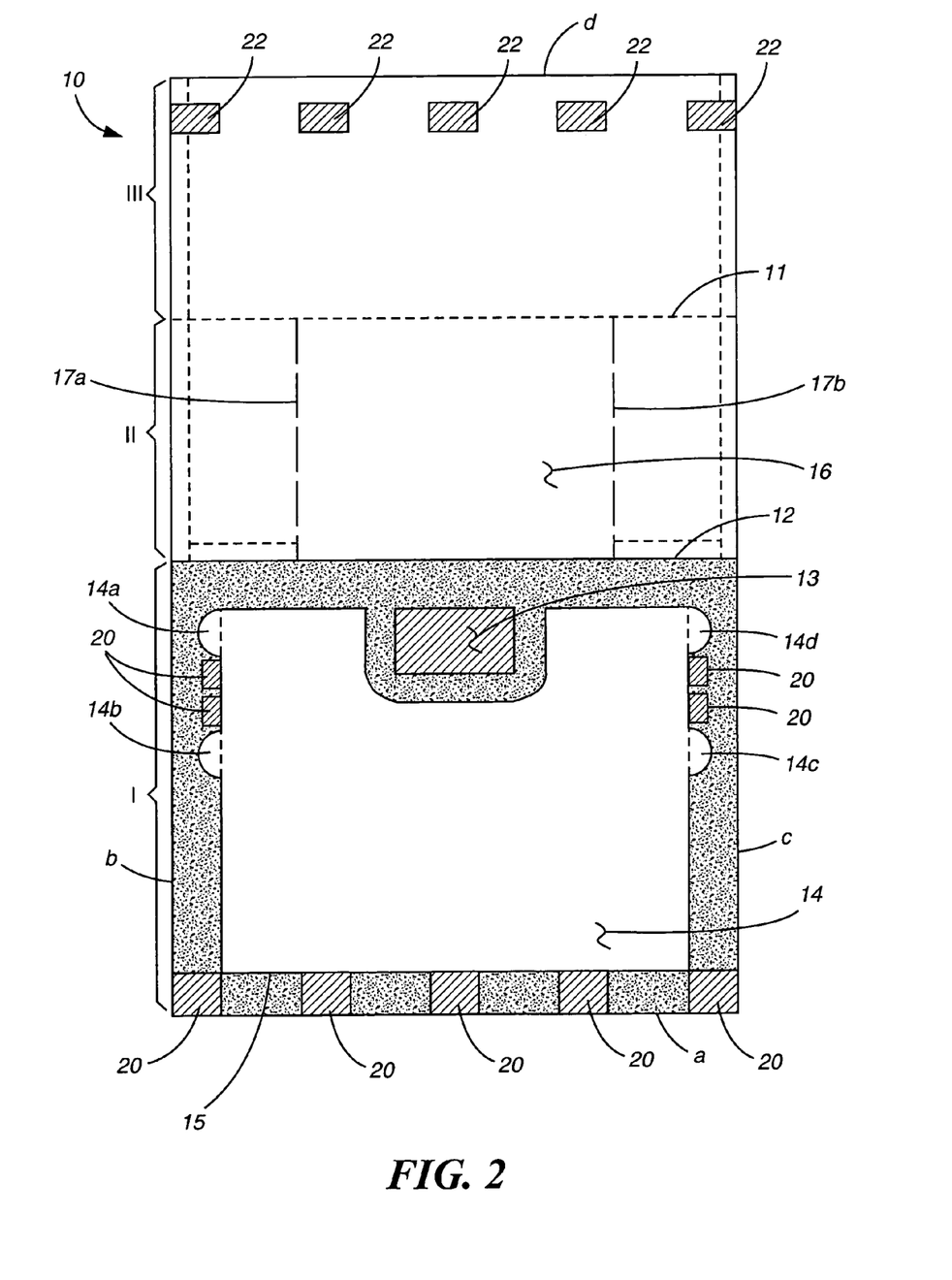
FIG. 2 is a plan view of the back (inner) face of the top ply of the postal form assembly according to a first embodiment of the subject invention.

FIG. 2 shows the back or inner face of the top ply of assembly 10, illustrating the areas on which adhesive (shown as striations) and adhesive-release material (stippling) can be patternly disposed to provide an operational assembly. For convenience of reference, the sections formed by perforations and die-cuts corresponding to the front face of the top ply are identified with the same numerical designations as shown and described for FIG. 1. Notably, FIG. 2 is viewed as if FIG. 1 was turned over to view its back face.

Referring specifically to FIG. 2, Panel I is shown to comprise adhesive (shown as striations) disposed substantially over the entire back face of label section 13. This adhesive area serves to adhere the label section to the return receipt post card section 16 of Panel II when the form assembly is in its final outgoing configuration. In addition, Panel I comprises adhesive disposed on substantially rectangular notched areas 20, referred to herein as "knockouts", outside and around the perimeter edges of correspondence section 14. The remainder of the perimeter edges outside correspondence section 14, and outside tabs 14a, 14b, 14c, and 14d, have adhesive-release material 21 (stippling) disposed thereon. Preferably, the adhesive and adhesive-release material are disposed such that an adhesive-free or adhesive-release-free area remains between the material and any edge thereof to prevent oozing of the material onto an adjacent section during processing. Typically the adhesive-free or adhesive-release-free area is approximately ⅛-1/16 inches in width.

The inner, or back, face of the top ply of Panel II is adhesive-free and adhesive-release-free.

Panel III shows substantially rectangular die-cuts 22 intervally positioned along, but inset from, top edge d. The die-cuts 22 have adhesive material disposed thereon. The interval positions and size or shape of die-cuts 22 are not critical and can be varied so long as they perform the intended task of providing contact with and adhesion to an opposing ply.

Figure 3:
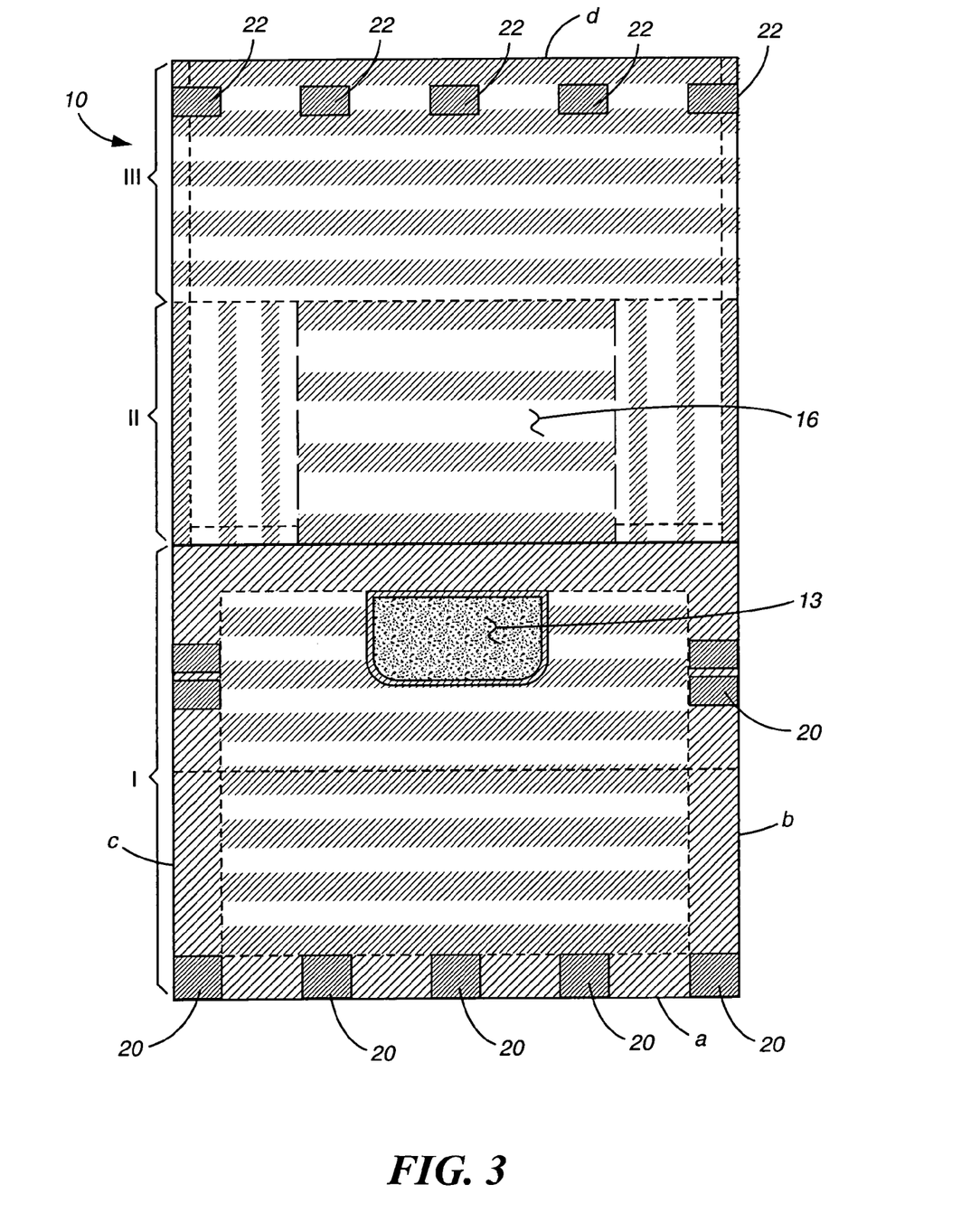
FIG. 3 is a plan view of the inner face of the back ply of the postal form assembly according to a first embodiment of the subject invention.

FIG. 3 shows the inner face of the back ply of assembly 10, illustrating the areas on which adhesive (shown as striations) and adhesive-release material (stippling) can be patternly disposed to provide an operational assembly. For convenience of reference, the sections formed by perforations and die-cuts are identified with the same numerical designations as shown and described for FIGS. 1 and 2. Notably, FIG. 3 is substantially identical to FIG. 2, except for the size of label section 13, which is made to correspond to the area of the "U"-shaped area of label section 13 in the top ply (rather than the die-cut label, itself), and the disposal of adhesive or adhesive-release material.

Referring specifically to FIG. 3, Panel I is shown to comprise adhesive disposed substantially over its entire inner face except on label section 13, which is substantially covered with adhesive-release material in its center area, and having adhesive material disposed peripherally around its outer edge. Panels II and III of the inner face of back ply of assembly 10 are also substantially covered with adhesive material. To save on the amount of adhesive material used, said adhesive can be disposed in striations on much of the major areas of the form, rather than a "sheet" of adhesive covering the entire area. Nevertheless, a preferred embodiment includes full coverage of die-cuts 22 with adhesive to ensure proper adhesion.

Figure 4:
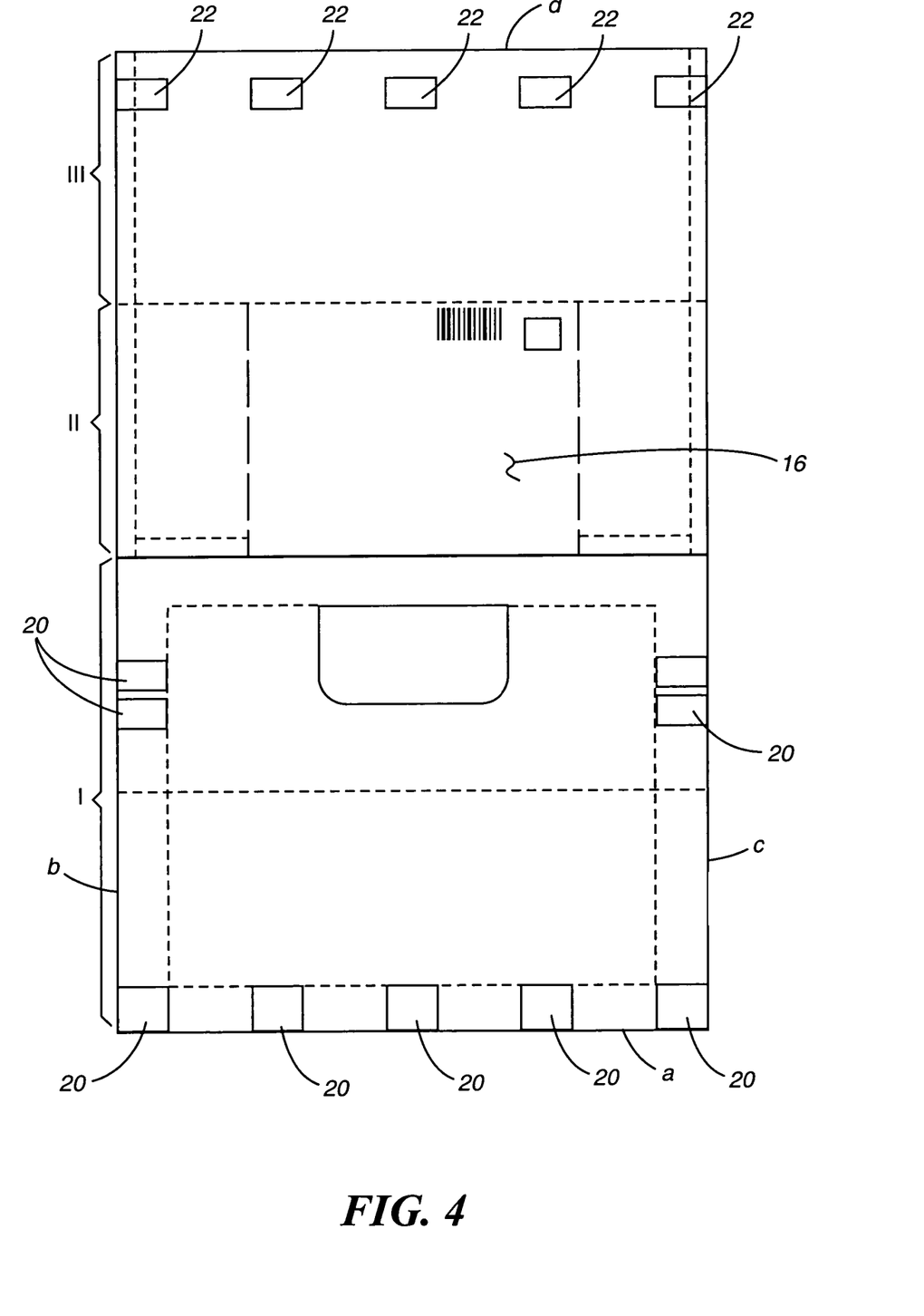
FIG. 4 is a plan view of the outer face of the back ply of the postal form assembly according to a first embodiment of the subject invention.

FIG. 4 shows the outer or back face of the back ply of form assembly 10. The sections formed by perforations and die-cuts are identified with the same numerical designations as shown and described for FIGS. 1, 2, and 3. Notably, FIG. 4 is substantially identical to FIG. 3, including the size of label section 13, which corresponds to the area of the "U"-shaped area of label section 13 in the top ply (rather than the die-cut label, itself). No adhesive or adhesive-release material is disposed on the outer face of this back ply. In a preferred embodiment used for special mailing services, the back ply can be pre-printed with color, information, indicia, or graphics (e.g., bar code and postage area shown), consistent with that mailing service. For example, for use with certified mail, a green bar can be pre-printed at the top edge of Panel III. In addition, Panel II can include pre-printed color, information, indicia, or graphics to provide a back face of post card section 16. Preferably, the graphics, information, or indicia are pre-printed in a configuration which provides a blank area wherein label section 13 can be automatically positioned when folded during operation of the form assembly.

Figure 5:
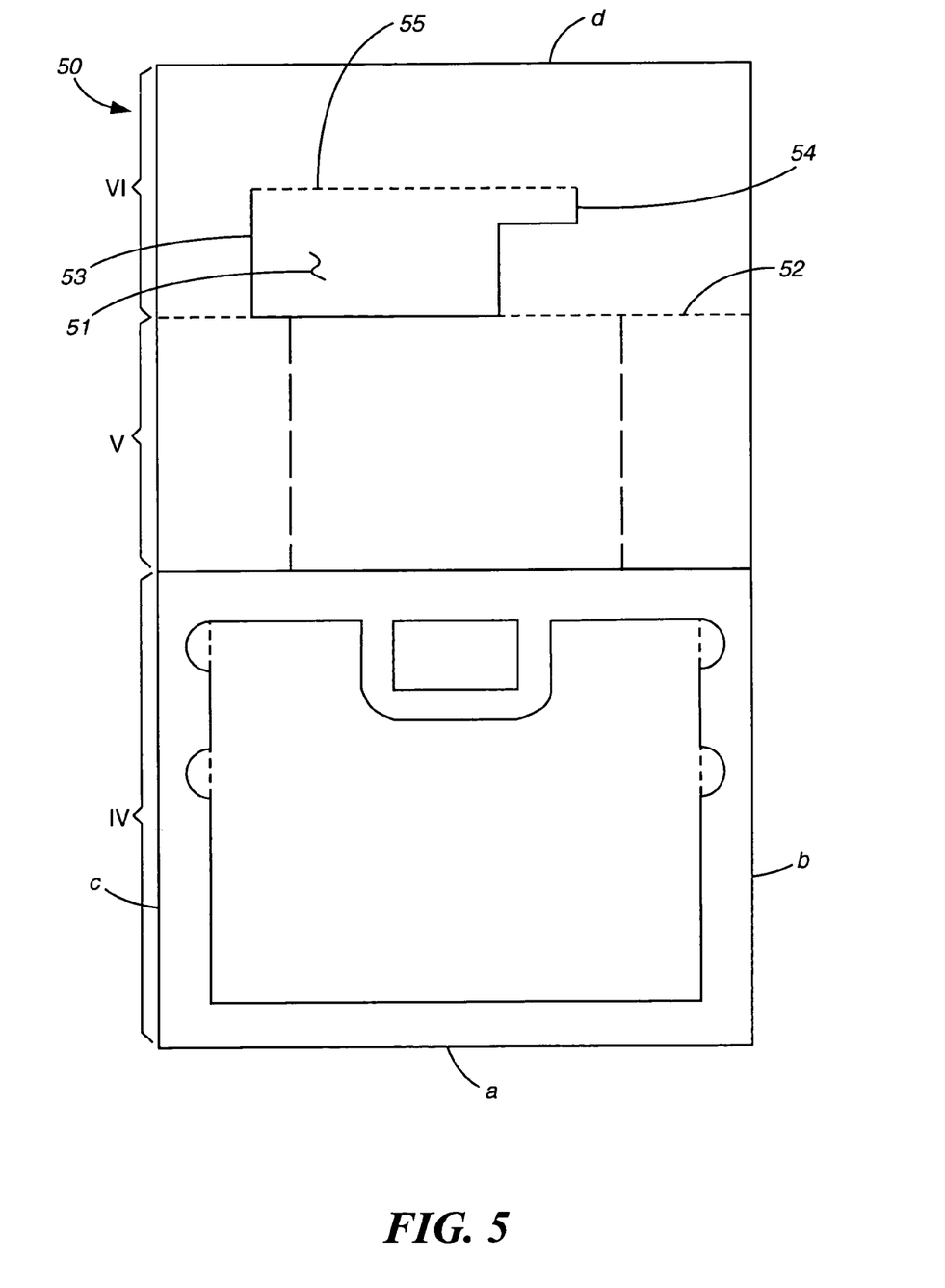
FIG. 5 is a plan view of the front (outer) face of the top ply of the postal form assembly according to a second embodiment of the subject invention.
Figure 6:
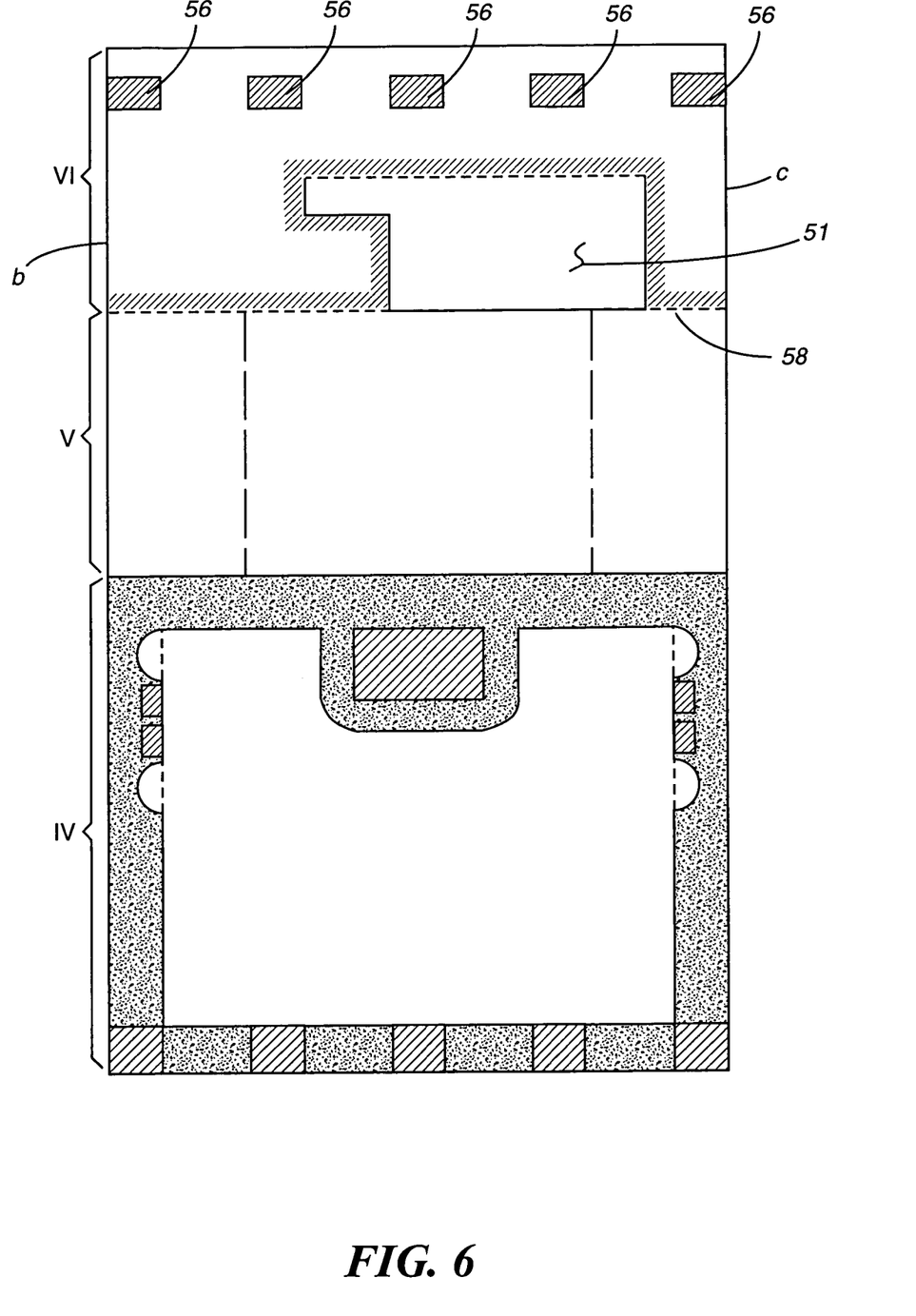
FIG. 6 is a plan view of the back (inner) face of the top ply of the postal form assembly according to a second embodiment of the subject invention.
Figure 7:
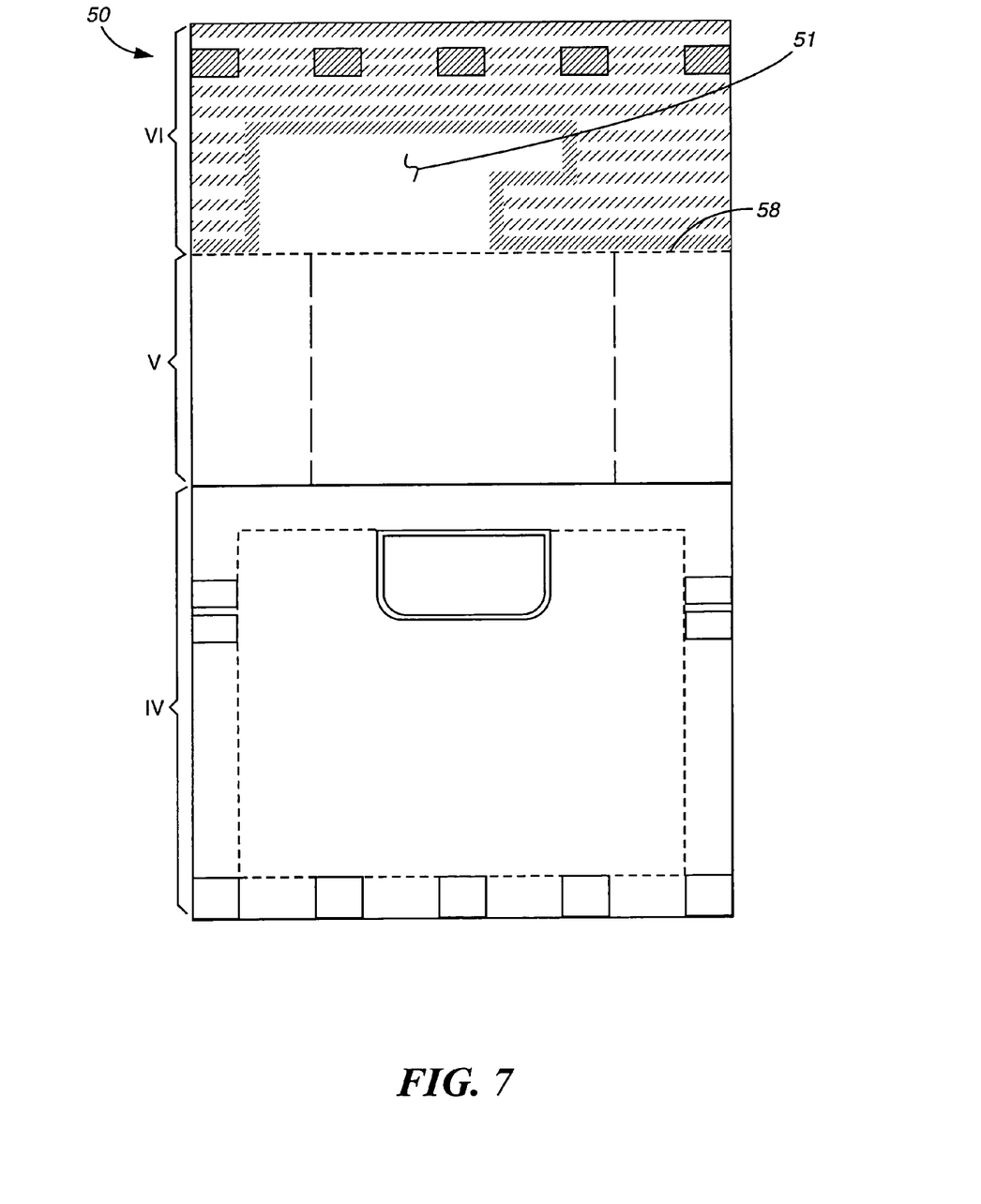
FIG. 7 is a plan view of the inner face of the back ply of the postal form assembly according to a second embodiment of the subject invention.
Figure 8A:
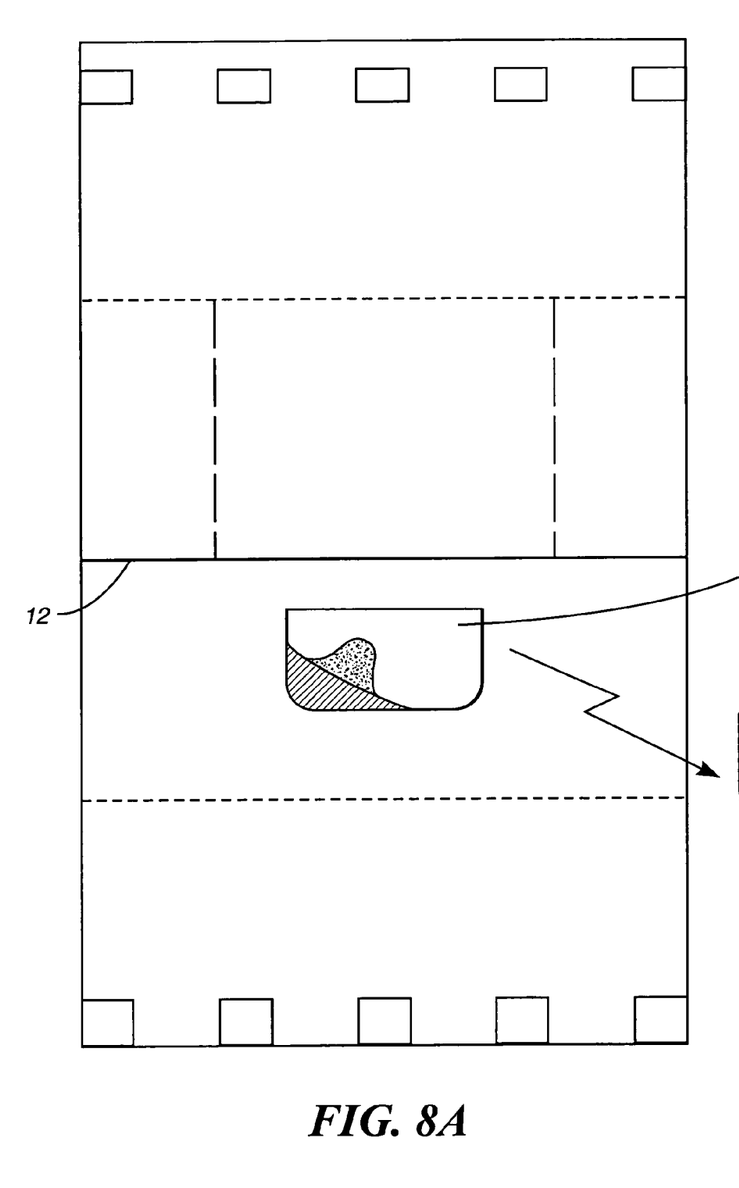
FIGS. 8A and 8B show the back, outer face of the back ply of an embodiment of the subject invention, illustrating removal of the backing from the post card label section to expose adhesive disposed thereon.
Figure 8B:
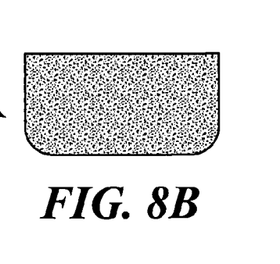

A second embodiment of the subject invention is shown in FIGS. 5-7. This second embodiment is substantially similar to the first embodiment except that the form assembly additionally includes a sender's receipt section. FIG. 5 shows a front face of a top ply of form assembly 50. Panels IV and V of this second embodiment are substantially identical to Panels I and 11 for the first embodiment shown in FIGS. 1-4. However, Panel VI includes a die-cut and perforation forming a sender's receipt section 51. Sender's receipt section 51 is preferably substantially rectangular in shape. In the embodiment shown, the substantially rectangular section includes a "tail" portion extending from the rectangle. Sender's receipt section 51 is defined by a portion of perforation 52 (dividing Panels V and VI) at its bottom edge, die-cut 53 at its left edge, die-cut 54 at its right edge, and perforation 55 forming its top edge. Advantageously, the sender's receipt section can be provided in Panel VI as a removable label section without interfering with or overlapping onto the addressee address print field (which is positioned in the identical area as in Panel I of the first embodiment described herein above. More preferably, the sender's receipt section is provided as a single-ply tear-off label which is removable from the corresponding area of the inner face of the back ply. Most preferably, the sender's receipt section can have one side edge configured as a perforation having a slit formed therein for access by a finger of a user so that the sender's receipt section can be easily removed. Alternatively, the slitted perforation in the side edge can be formed to provide a rounded tab to facilitate manipulation and removal of said section.

FIG. 6 shows the inner face of the top ply of assembly 50, illustrating the patterning of adhesive material disposed on said inner face. Patterning of adhesive and adhesive-release material on Panels IV and V is identical to that shown for Panel I in FIG. 2 and Panel II in FIG. 3, respectively. In Panel VI, adhesive is disposed around three perimeter edges (top, and two sides) and along dividing perforation 58, excluding the area along bottom edge of sender's receipt section 51. An adhesive-free gap can be provided around the perforation or die-cuts to prevent oozing of the adhesive during processing. Adhesive is also disposed on die-cuts 56 in a pattern substantially identical to die-cuts 22 of FIG. 2.

FIG. 7 illustrates the patterning of adhesive and adhesive-release material disposed on the inner face of the back ply Panel VI. Specifically, adhesive is disposed substantially over the entire area of Panel VI except for the sender's receipt section 51. As shown her, adhesive can be disposed in a "lined" pattern in order to use less adhesive material than if disposed over the entire surface of the panel face. It is noted that sender's receipt section 51 is formed in the top ply only; accordingly, the back ply does not include a perforation corresponding to the top and side edges of sender's section 51. The adhesive and adhesive-release patterns on this inner face of back ply Panels IV and V are substantially identical to those of the corresponding faces of Panels I and II of the first embodiment as described herein above.

The back face of back ply Panels IV, V, and VI for the second embodiment of the subject invention is identical to the back face of the back ply of Panels I, II, and III of the first embodiment of the subject invention as shown in FIG. 4

In operation, an end-user utilizing an intact assembly 10 comprising front and back plies patternly adhered together, can print address and other mailing information or indicia, including postage indicia, on the front face of the top ply by a single pass through a non-impact printer. The assembly can then be folded to form a single outgoing mailer, having a text message or other printed information contained therein, said mailer including a return receipt post card conforming to USPS requirements for special mailing services, e.g. Certified Mail. Once the outgoing mailer is received by a recipient, the return receipt post card can be signed by the recipient and returned to the sender by normal postal channels.

An illustration of the steps taken by the user for operation of the subject mail form assembly is shown in FIGS. 8-12. For purposes of illustration, the process is described in reference to the second embodiment because it includes all the steps required for the first embodiment, plus it includes the operational steps relating to the sender's receipt section which is unique to the second embodiment. As shown in FIGS. 8A and 8B (same view as FIG. 4), after the two-ply postal form assembly is fed through a conventional non-impact printer and the desired information printed, the back ply area corresponding to label section 13 is removed (FIG. 8A) and can be discarded (FIG. 8B). The removal of the back ply of the label section 13 provides exposure of the underlying adhesive material disposed on the corresponding area 13 of the inner face of the top ply.

Figure 9A:
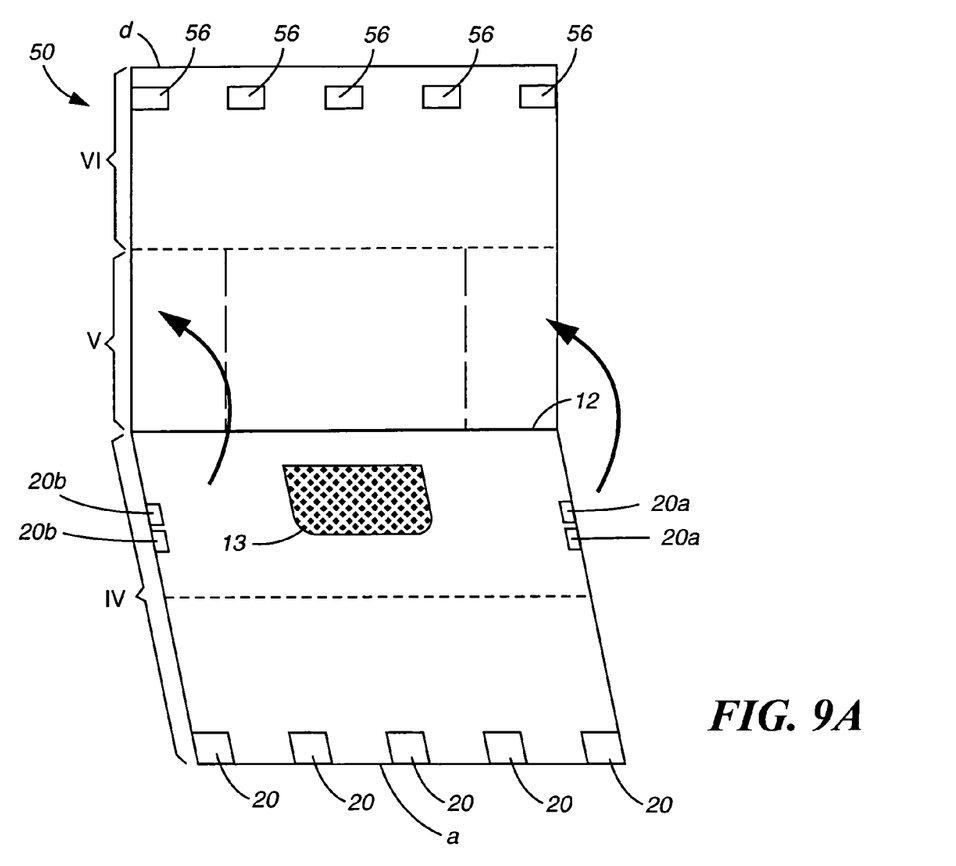
FIGS. 9A and 9B illustrate the configuration of an embodiment of the subject assembly immediately prior to (FIG. 9A) and immediately after (FIG. 9B) the initial folding step for operation of the assembly by a user.
Figure 9B:
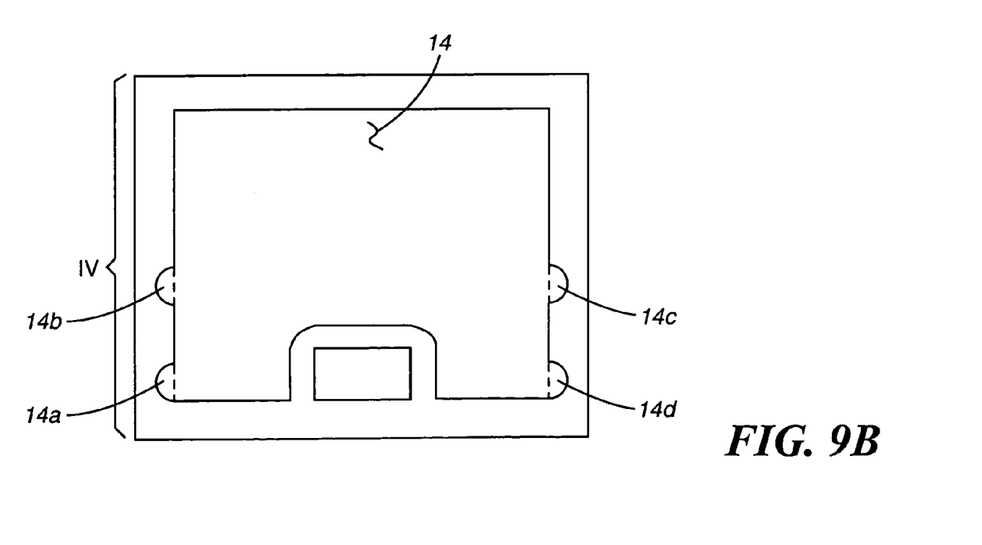

FIGS. 9A and 9B illustrate the postal form assembly 50 as folded along dividing perforation 12 so that the back outer face of the back ply is folded over to meet itself, exposing the front face of the front ply on both sides of the halved form. Preferably, die-cut areas 20 along the bottom edge meet and adhere together in an offset configuration to the corresponding die-cut areas 56 at the top edge d. Following the first folding action along fold line 12, top edge d will therefore preferably extend past bottom edge a exposing the special mail service indicia pre-printed at top edge a. Advantageously, when folded in this manner, the top panel label section 13 adheres to, is automatically transferred to, and is properly positioned relative to, the back face of the back ply of post card section 16. In addition, by the act of folding along fold line 12, die-cut areas 20a and 20b along the side edges of panel IV adhere to corresponding areas of Panel V.

Figure 10:
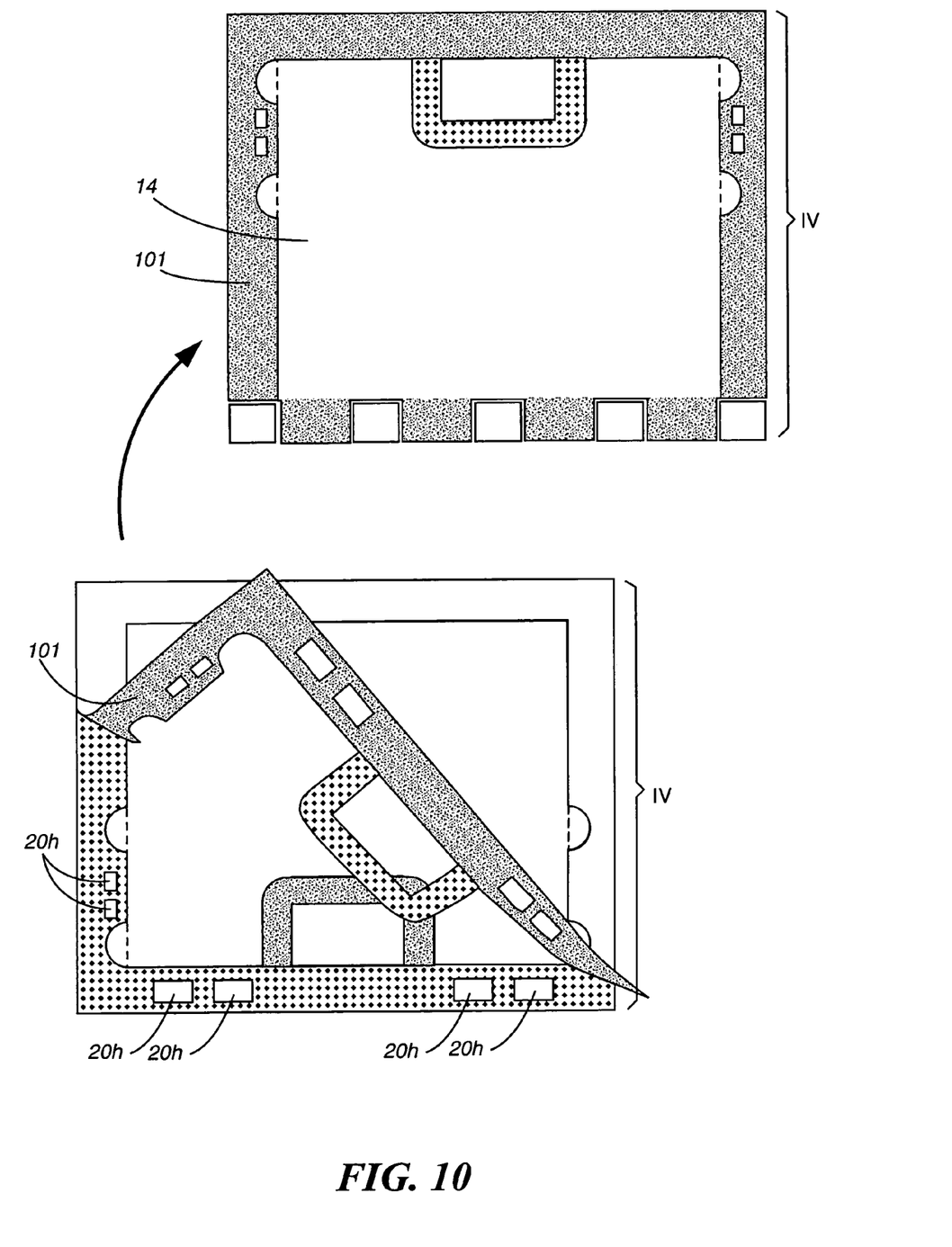
FIG. 10 shows the step for removing the frame around the correspondence section for exposing adhesive disposed thereon.

As shown in FIG. 10, the top ply perimeter ring or frame 101 bordering correspondence section 14 and tabs 14a-14d, which has adhesive-release material on its inner face, can be removed by separation from the corresponding area on the back ply to expose adhesive material disposed on the inner face of said area on the back ply. The perimeter ring can be discarded. In addition, this removal of the perimeter ring 101 removes these areas 20, 20a and 20b from the front ply of Panel IV, leaving holes 20h so that the back ply having exposed adhesive can adhere onto itself through those areas 20h. Thus, at this stage, the user has a substantially four-ply form having Panel IV as one outer face, and Panels V and VI as the other outer face.

Figure 11:
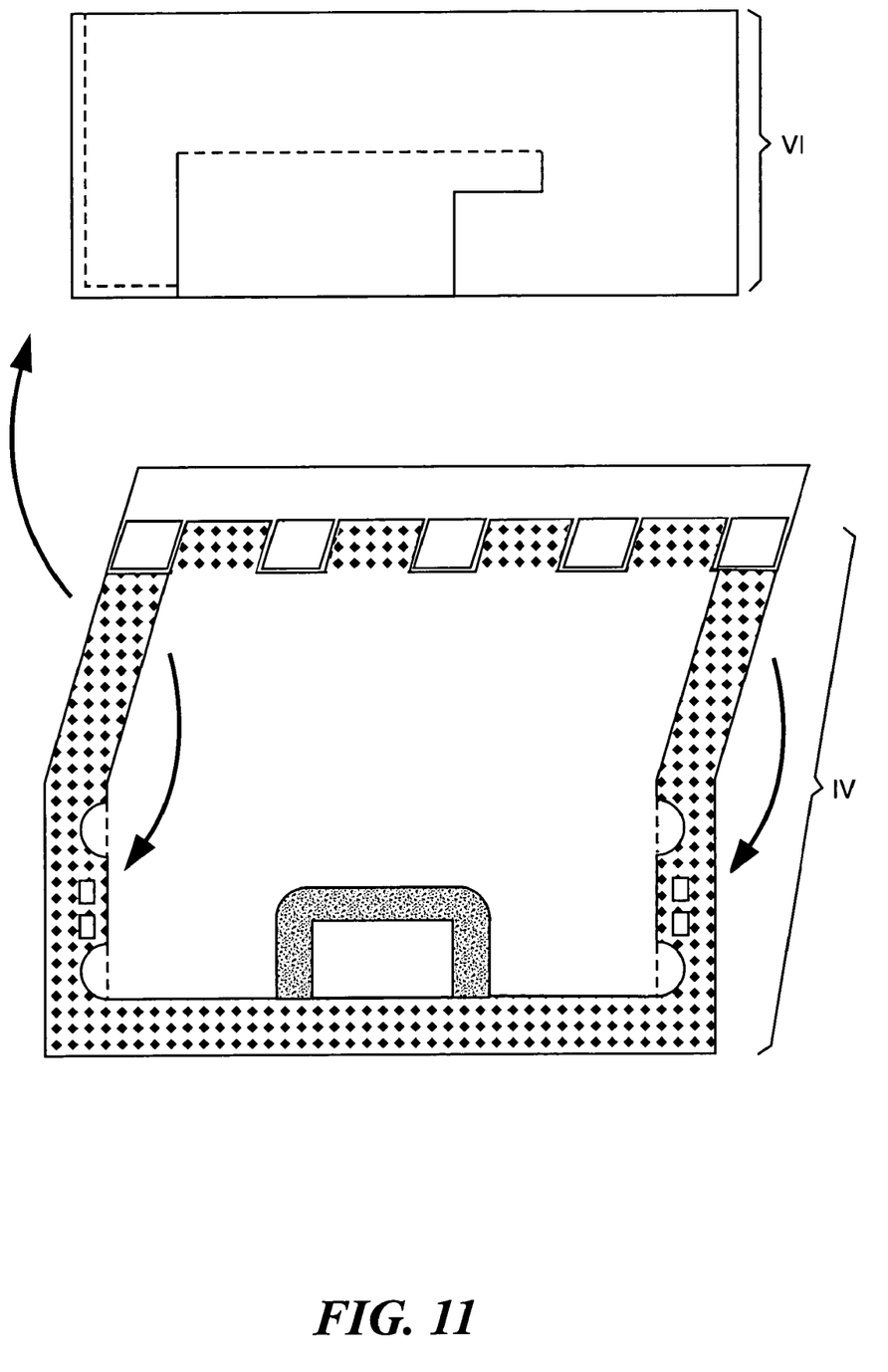
FIG. 11 illustrates the second folding step for operation of the assembly according to the subject invention.
Figure 12:
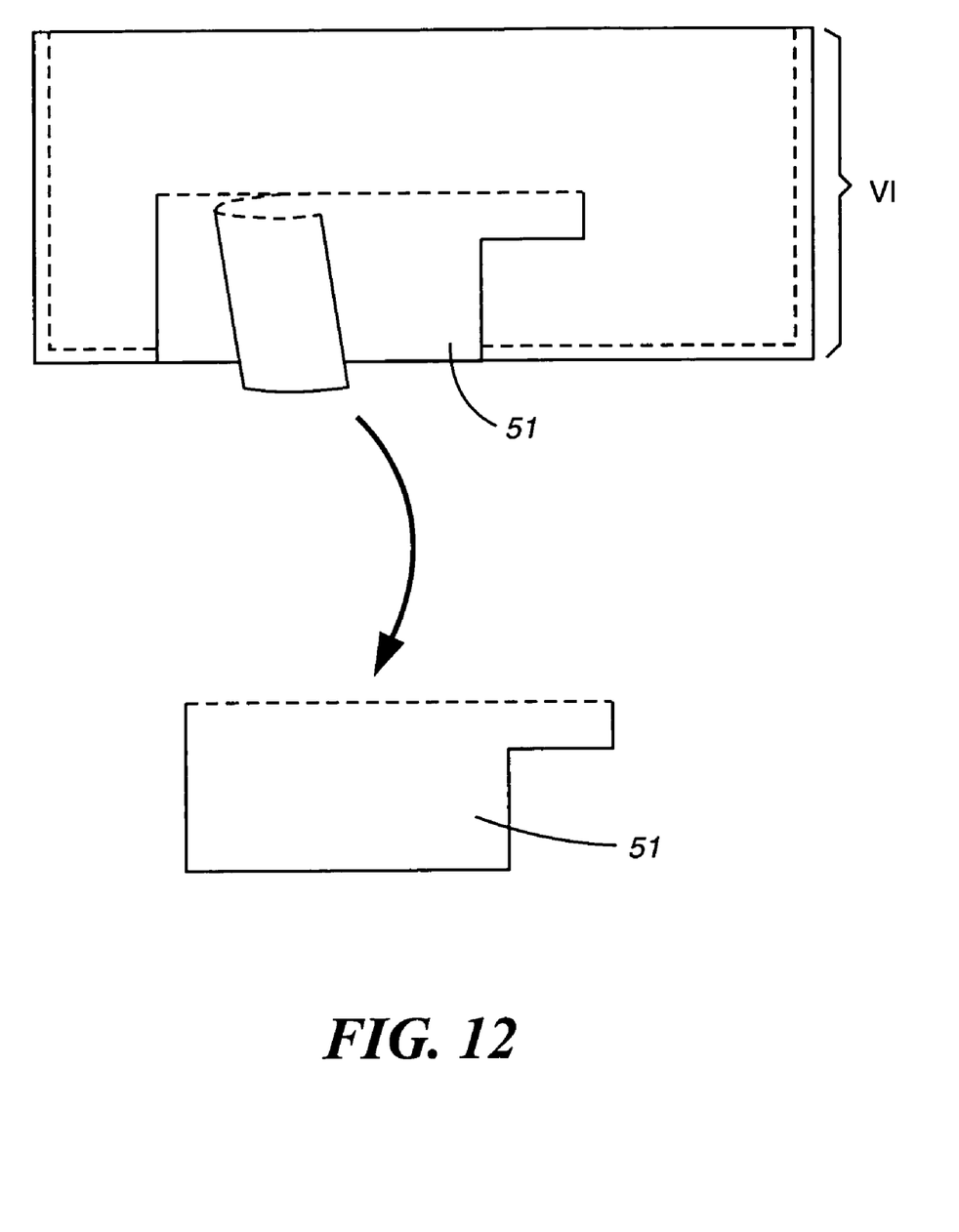
FIG. 12 shows Panel VI according to a second embodiment of the subject invention, illustrating removal of the sender's receipt section.

With the adhesive exposed by removal of the perimeter ring, the folded assembly is folded a second time along perforation 52, adhered together by contacting the exposed adhesive to the opposing face, and enclosing the correspondence section within the outgoing mailer (FIG. 11). In one embodiment, Panel IV can be scored, provided with a perforation fold line, or a fold line can be printed thereon in a position that corresponds to perforation 52 in order to facilitate folding. The outgoing mailer in its final folded configuration has Panel VI comprising the sender's receipt as one outer face, and Panel V comprising the return receipt post card as the other outer face. The mailer can now be sent via conventional postal service, whereby the sender's receipt can be removed at the time of mailing for record retention (FIG. 12).

Once the outgoing mailer is received by the recipient, delivery information can be entered onto the post card section, which is then removed and returned to the sender by the postal worker to verify receipt of the document. The recipient can open the outgoing mailer by breaking the bond of the adhesive and receive the information printed on the correspondence section. In addition, the die-cuts and perforations bordering the mailer can facilitate opening of the mailer envelope so that the written information can be retrieved for record retention by the recipient.

Generally, the invention has been described in its preferred form or embodiment with some degree of particularity, it is to be understood that this description has been given only by way of example and that numerous changes in the details of construction, fabrication and use, including the combination and arrangement of parts, may be made without departing from the spirit and scope of the invention.

The invention claimed is:

1. A mailing form assembly comprising:
   a top ply with a front outer face and a back inner face on an opposite side of the top ply, the front outer face being divided by into at least two top ply panels by at least one top ply fold line, a plurality of sections formed in at least one of the top ply panels, the sections include a correspondence section, a top side of a return response post card, and a label section for a back side of the return post card, wherein the front outer face being printable by a single pass through an image-forming device which places a variable print image thereon; and
   a back ply with a front inner face and a back outer face on an opposite side of the back ply, the back outer face being divided by at least one back ply fold line into at least a first section and a second section,
      the first section located on a first side of the fold line including the back side of the return response post card formed from at least two plies when the front inner face of the back ply is selectively joined with adhesive to the back inner face of the top ply defining an edge of the return post card at the fold line and the top ply fold line placed parallel to the back ply fold line, and
      the second section located on a second side of the back ply fold line includes a die cut section forming a removable back ply area corresponding to the label section of the top ply, so that when the back ply area of the label section is removed, an adhesive layer on the back inner face of the top ply is exposed;
   whereby when folding at the back ply fold line the first section on top of the second section of the back outer face, the label section is affixed by the adhesive on the back inner face to the back side of the return post card with the variable print image on both the front side and the back side.

2. The mailing form of claim 1, wherein the return response post card is compliant with United States Postal Service Postal Code standards.

3. The mailing form of claim 1, wherein the plurality of sections include a sender's receipt section compliant with a United Stated Postal Form 3800.

4. The mailing form of claim 1, wherein the at least two top ply panels include a third top ply panel with a third section divided by at least a second fold line from the second section and wherein the third section is a front outer face of an envelope and the first section includes the correspondence section with a font surface removable frame and a third fold line dividing the correspondence section from the label section, so that when the front surface removable frame is removed, an adhesive is exposed and whereby when folding at the third fold line the correspondence section on top of the label section the correspondence section is covered by the front envelope section.

5. A mailing form assembly comprising:
   a top ply comprising:
      a back inner face;
      a front outer face on an opposite face of the top ply from the back inner face, the front outer face being printable by a single pass through an image-forming device which places a variable print image thereon;
      a return response postcard first ply with a front outer face defined as a part of the back inner face and the front inner face;
      a lower portion defined as part of the back inner face and the front inner face, the lower portion comprising:
         a label for a back side of the return post card; and
         a correspondence section; and
      a first fold line dividing the response postcard from the lower portion; and
   a back ply comprising:
      a front inner face adhesively attached to the back inner face of the top ply;
      a back outer face on an opposite face of the back ply from the front inner face;
      a first section defined as a portion of the front inner face and the back outer face that is attached to form the back side of the return response post card with at least two plies, the top ply and the back ply; and
      a second section defined as a portion of the front inner face and the back outer face that is attached to the lower portion when attached to the back inner face, the second section comprising:
         a removable back ply area defined as a portion of the front inner face and the back outer face, the removable back ply area configured to expose, when removed, an adhesive layer on the back inner face portion of the label for the back side of return post card; and
         a second fold line dividing the first section from the second section and
      located adjacent to the first fold line when attached to the back inner face,
   whereby folding the top ply and the back ply along the first fold line and the back fold line, respectively, to place the back outer face of the first section and the back outer face of the second section into contact with one another affixes the adhesive layer on the back inner face portion of the label for the back side to the return response postcard.

6. The mailing form of claim 5, wherein the return response post card is compliant with United States Postal Service Postal Code standards.

7. The mailing form of claim 6, wherein the plurality of sections include a front outer face of an envelope and the first section includes the correspondence section with a font surface removable frame and a third fold line dividing the correspondence section from the label section, so that when the front surface removable frame is removed, an adhesive is exposed and whereby when folding at the third fold line the correspondence section on top of the label section the correspondence section is covered by the front envelope section.

8. The mailing form of claim 5, wherein the front outer face includes a plurality of sections including a sender's receipt section compliant with a United Stated Postal Form 3800.

* * * * *